Nov. 5, 1963 A. S. KROTZ 3,109,521
AUTOMATIC TRAILER BRAKE SYSTEM
Filed Dec. 9, 1959 2 Sheets-Sheet 1
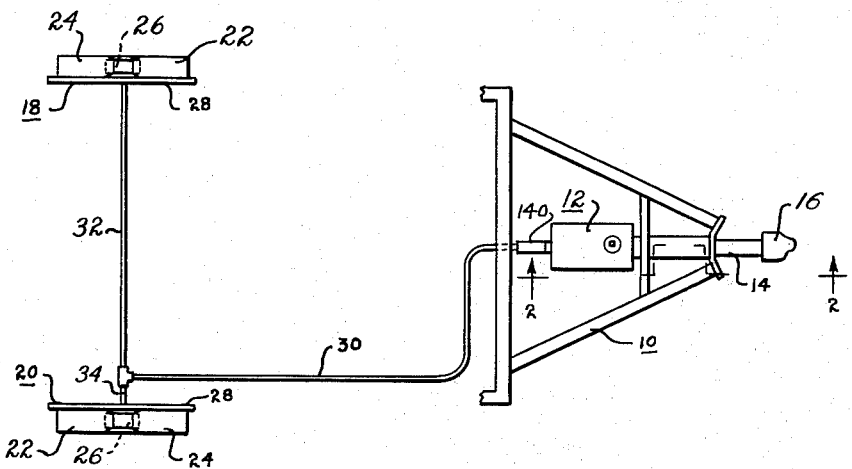
FIG. 1
FIG. 2
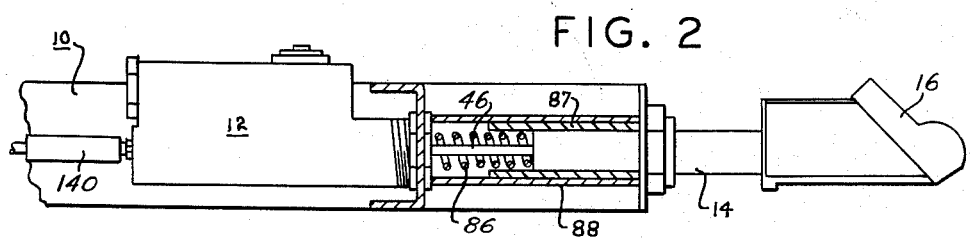
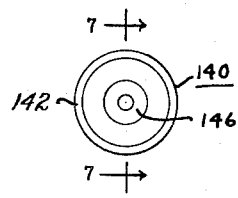
FIG. 6
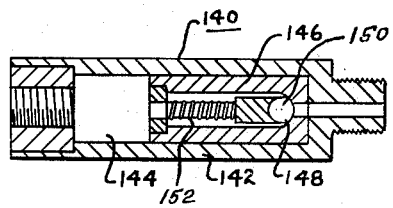
FIG. 7
INVENTOR.
ALVIN S. KROTZ
BY
ATTORNEY Nov. 5, 1963  A. S. KROTZ  3,109,521
AUTOMATIC TRAILER BRAKE SYSTEM
Filed Dec. 9, 1959  2 Sheets-Sheet 2

INVENTOR.
ALVIN S. KROTZ
BY M. A. Hobbs
ATTORNEY

Patented Nov. 5, 1963

3,109,521
AUTOMATIC TRAILER BRAKE SYSTEM
Alvin S. Krotz, Elkhart, Ind., assignor, by mesne assignments, to Dexter Axle Company, Inc., Elkhart, Ind., a corporation of Delaware
Filed Dec. 9, 1959, Ser. No. 858,534
4 Claims. (Cl. 188—112)

The present invention relates to brake systems and more particularly to automatic brake systems for vehicle trailers, mobile homes and the like.

Considerable work has been expended in the past in an effort to develop a satisfactory brake system for vehicle trailers, using the towing and inertia forces exerted on the hitch, which will operate automatically when the power vehicle is decelerated and which will automatically release the brakes on the trailer when the power vehicle is backing the trailer. One of the difficulties encountered in these automatic operations is that of obtaining effective release of the trailer brakes under all conditions of operation and under various conditions in the brake system, including the degree of wear and adjustment. Another difficulty has been in overcoming the effect of rough terrain varying the towing and inertia forces and occasionally causing rapid shifting between towing and inertia forces on the brake actuator. It is therefore one of the principal objects of the present invention to provide a braking system actuated by the push and pull forces created between the towed and towing vehicles, which releases the brakes when a predetermined reverse force is applied to the towed vehicle by the towing vehicle and which is not affected in operation on rough streets, roads or other uneven terrain over which the towed vehicle is pulled.

Another object of the present invention is to provide a brake actuator for a trailer operated by to and fro forces applied to the tow bar connecting the trailer to an automobile, truck, tractor or the like and embodying a shock absorber action to prevent undesirable and unintentional application and releasing of the brakes and lunging or jerking of the towed vehicle.

Still another object of the invention is to provide a brake actuator of the aforesaid type which effectively adapts its operation to the conditions of the brake shoes and cylinders, both in the application of the brakes and in releasing the brakes in response to the backing force applied by the towing vehicle to the trailer.

A further object is to provide a relatively simple and compact automatic brake actuator for a vehicle, which can be readily assembled in operating position on a variety of different sizes and makes of trailers and which can be serviced and maintained in condition to give optimum performance without the use of any special skills, tools or equipment.

Additional objects and advantages of the present invention will become apparent from the following description and accompanying drawings, wherein:

FIGURE 1 is a diagrammatical illustration of a trailer brake system embodying the present invention, showing a portion of the trailer frame with my brake actuator mounted thereon;

FIGURE 2 is a side elevational view of my brake actuator and a vertical cross sectional view of a portion of the trailer taken on line 2—2 of FIGURE 1, a portion of the actuator being cut away to show certain structural details;

FIGURE 6 is an end view of a brake adjustment mechanism included in the present system; and FIGURE 7 is a cross sectional view of the mechanism shown in FIGURE 6, taken on line 7—7.

Figure 3:
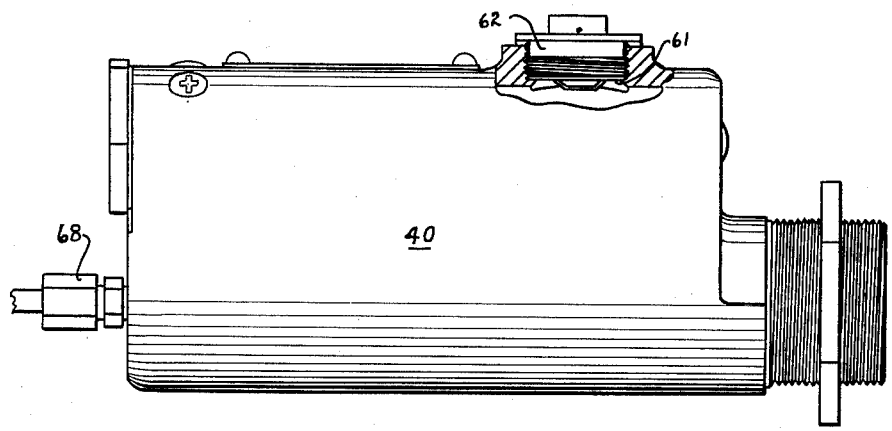
FIGURE 3 is an enlarged side elevational view of the present brake actuator.
Figure 4:
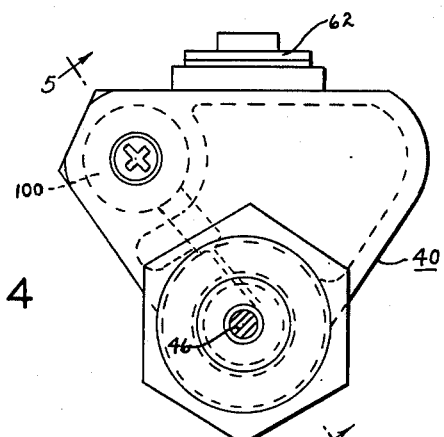
FIGURE 4 is an end view of the brake actuator shown in FIGURE 3.

Referring more specifically to the drawings and to FIGURE 1 in particular, numeral 10 designates a portion of a trailer frame on which the present brake system is mounted, 12 is a brake actuating mechanism, 14 a tow bar for the trailer, 16 a hitch for connecting the tow bar to the towing vehicle (not shown), and 18 and 20 wheel brake assemblies for the left and right wheels, each including brake shoes 22 and 24, hydraulic cylinder 26 and backing plate 28. The two brake assemblies 18 and 20 are connected with the actuating mechanism 12 by main hydraulic line 30 and branch lines 32 and 34, respectively. The particular type and construction of hydraulic wheel brake assemblies used on the towed vehicle are not important in the present invention. Those shown may be considered, for the purpose of the description, as conventional or standard assemblies available from a number of different manufacturers, and will not be described in detail herein. The present brake system and brake actuating mechanism may be used on trailers, mobile homes and other towed vehicles of various sizes, designs and constructions.

Figure 5:
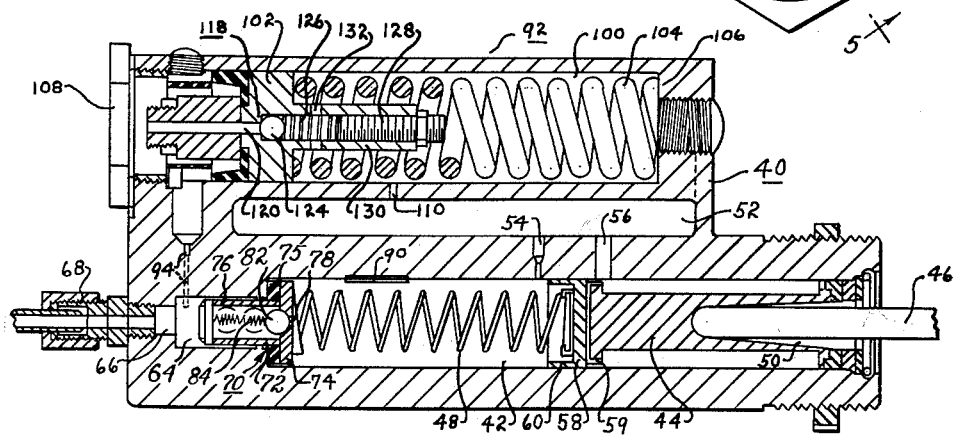
FIGURE 5 is a cross sectional view of the brake actuator shown in the preceding figures, taken on line 5—5 of FIGURE 4.

The present brake actuating mechanism 12 shown in FIGURE 5 consists of a housing 40 having a master cylinder 42 with a piston 44 therein, which is adapted to be moved from the position shown by a push rod 46 to the left end of the cylinder, as viewed in FIGURE 5, and returned by spring 48 to its inoperative position shown in the drawing. The end of rod 46 shown in FIGURE 5 seats in a deep recess 50 in the piston 44 and the other end of the rod is operatively connected to tow bar 14, as will be more fully described hereinafter. Housing 40 contains a hydraulic fluid reservoir 52 connected to cylinder 42 by compensating port 54 in front of piston 44 when the latter is fully withdrawn, and by an input port 56 behind the head portion 58 of piston 44. Ports 59 through head 58 permit fluid to flow from the back to the front side of the head and around gasket cup 60 into the forward end of cylinder 42 when the piston is retracted. Cup 60 functions as a valve to control the flow of fluid through ports 59, preventing the flow from the forward side of the head to the rear side. An opening 61 having a vented cap 62 is provided in the upper side of the housing for filling the reservoir with fluid. For convenience of description in the specification and appended claims, the terms "front" and "forward" side of the piston or end of the cylinder in the actuating mechanism refer to the side of the piston on which the gasket cup is located, and the terms "back," "behind" and "rear" side of the piston of end of the cylinder refer to the side thereof opposite the gasket cup.

Cylinder 42 is connected to the hydraulic fluid lines leading to the brake cylinders by passages 64 and 66 and coupling 68 and the fluid flow through these passages is regulated by inlet and outlet valve assembly 70. The inlet valve consists of a valve element 72 urged to its seat on the end wall by spring 48 and having an enlarged inner end 74 with a gasket 75 for seating on the end wall of cylinder 42 and closing passage 64. End 74 is spaced from the side walls of the cylinder and is centered with respect to passage 64 by the close proximity of the side wall of cylinder 42. Stem 76 is hollow and is connected to cylinder 42 by a port 78, which is closed while the brakes are off by an outlet valve consisting of a ball 82 urged to its seat around port 78 by spring 84. The valve assembly 70 performs the function of sealing the master cylinder from the lines during the bleeding operation and maintaining a predetermined minimum pressure, for example, three to four pounds of pressure on the line and wheel cylinders at all times, to assure a positive seal at the wheel cylinder cup packing and to avoid leakage. For initial actuation of the brake piston 44, sufficient force must be applied by tow bar 14 to overcome springs 48 and 84 and a spring 86 reacting between the inner end of bar 14 and the adjacent end of housing 40. The tow bar and sleeve 87 reciprocate in tube 88.

One of the important features of the present actuating mechanism is the automatic brake release when the towing vehicle endeavors to back the towed vehicle. In the present type of automatic braking system, the brakes are applied either by a more rapid deceleration of the towing vehicle than the towed vehicle or by the towing vehicle applying back up pressure on the towed vehicle. In the latter situation, if the rearward thrust of the tow bar is sufficient to apply a considerable braking application, the brakes must be released either manually or automatically before the towed vehicle can be effectively reversed. The present actuator includes a relatively simple and effective brake releasing means which will adapt itself to various conditions of the terrain over which the vehicle is traveling. The brake release mechanism includes the combination of a groove or passage 90 in the wall of cylinder 42 and an accumulator 92 connected to passage 64 by a conduit 94, said groove permitting the fluid in the forward end of cylinder 42 to by-pass piston 44 when the latter approaches the end of its stroke, thus releasing the fluid pressure transmitted to the brake cylinders and accumulator 92. Groove 90 is longer than the width of piston head 58 so that the groove can communicate freely with the cylinder on both sides of the head when the latter passes over the groove. The combination of groove 90 and accumulator 92 acts as a pop-off valve, relieving the system of extreme shock and possible damage. Since the quantity of fluid required to fully apply the brakes varies depending upon the conditions of the brake cylinders, shoes and drums, the amount of pressure required to advance piston 44 to groove 90 would, if the accumulator were not included in the unit, vary accordingly up to a point after which the piston would not advance without seriously damaging the system.

The accumulator consists of a cylinder 100, piston 102 and spring 104 reacting between the back side of piston 102 and the end wall 106 of the cylinder. The left hand end of the cylinder is closed by a removable cap 108 to permit the spring and piston to be assembled in the cylinder, and the right hand end of the cylinder is connected to the reservoir by a port 110. Spring 104 is calibrated to yield at a predetermined pressure, permitting piston 44 to move to the forward end of cylinder 42 until head 58 is over groove 90. A pressure release means 118 consisting of a by-pass and check valve unloads the brake system at a predetermined accurately controlled pressure therein regardless of the condition of the brake shoes and wheel cylinders. A passage 120 extends through piston 102 and is controlled by a check valve consisting of a ball 124 in an enlarged portion of passage 120 seating over the inner end thereof. The ball element is urged to its seat by a spring 126 adjusted by a stem 128 threadedly received in an extension 130 on the rear side of the piston. The compression on spring 126 determines the pressure required to unseat ball 124 and by-pass fluid through ports 132 and 110 to the reservoir, thus permitting piston 44 to move forward to the point where groove 90 releases the pressure in the brake system, thereby releasing the brakes on the vehicle.

In order to provide uniform operation of the brake system as the brake shoes wear, a compensating device 140 is included in the main hydraulic line 30, consisting of a body 142 having a cylinder 144 and a floating piston 146 with a spring loaded check valve 148 therein, consisting of a ball 150 and coil spring 152. The right hand end of the cylinder, as seen in FIGURE 7, is connected to the brake actuator and the left hand end to the line leading to the wheel cylinders. The piston travels sufficiently in the cylinder from the right hand end toward the left hand end to apply the brakes when the brake shoes are in satisfactory condition. If, however, the shoes are worn, additional fluid is supplied to the wheel cylinders through the check valve. The return of the piston to the right hand end of the cylinder, when the pressure is released by the brake actuator, fully releases the brakes, leaving the additional fluid in the line to compensate for the worn brake shoes.

In the operation of the present brake system, with the trailer hitched to an automobile, the brakes remain fully off while the trailer is being pulled by the automobile. When the automobile starts to decelerate, the trailer attempts to overtake the automobile and substantial compression pressure is placed on the tow bar which reacts through rod 46 to apply pressure on piston 44, forcing the hydraulic fluid in cylinder 42 through lines 30, 32 and 34 to the wheel cylinders, thus applying the trailer brakes. Simultaneously, fluid is forced through conduit 94 into the accumulator, moving piston 102 until the hydraulic pressure in the lines is balanced by the pressure of spring 104 on piston 102. Any subsequent change in force on hitch 16, displacing fluid in or out of accumulator cylinder 100, must move the fluid through passage 94 and past valve seat 74 and ball valve 82.

When the towing vehicle applies pressure on the tow bar to back the trailer, the trailer brakes are automatically applied lightly at first. If considerable force is required to back the trailer, the hydraulic pressure in the lines to the wheel cylinders and in cylinder 100 in front of piston 102 is increased, and as piston 102 is retracted, piston 44 advances in cylinder 42 until the fluid in front of the latter piston can flow through groove 90, by-passing head 58 and releasing the pressure in the wheel cylinders, and consequently releasing the trailer brakes. The pressure required to release the brakes in this manner is accurately controlled by adjusting the compression on spring 126. Opening of valve 124 relieves the pressure sufficiently to permit head 58 to register with groove 90 and fully release the pressure in the brake system. Thereafter the trailer can be backed without any interference from the brakes. As the pressure on the tow bar is released, springs 86 and 48 return piston 44 to the position shown in FIGURE 5, and during the return stroke, fluid behind the piston head 58 flows through ports 59 around cup 60 into the front portion of cylinder 42.

Although only one embodiment of the present invention has been illustrated and described in detail herein, various modifications and changes may be made without departing from the scope of the invention.

I claim:

1. In a brake system for a towed vehicle, a brake actuating mechanism including a housing having a master cylinder therein, a reservoir above said cylinder, a piston in said cylinder having a head and a recessed portion adjacent said head, a conduit connected to said housing for delivering fluid from the forward end of said cylinder to the vehicle brakes, a spring loaded outlet valve in said conduit, an inlet valve in the forward end of said cylinder, a spring in said cylinder reacting between said head and said inlet valve, ports connecting said reservoir with said cylinder on opposite sides of said head when said piston is fully withdrawn from the forward end of the cylinder, ports through said head for flow of fluid into the forward end of said cylinder, a longitudinally movable tow bar for connecting the towed vehicle to a towing vehicle, a spring for urging said bar toward the towing vehicle, a rod connecting said bar with said piston for urging said piston toward the forward end of the cylinder when a predetermined pressure is placed on said bar, a groove in the wall of said cylinder near the forward end thereof for by-passing fluid into said recessed portion, a second cylinder in said housing, a piston in said second cylinder, a spring in said cylinder urging said piston toward one end, a passage connecting said conduit on the outlet side of said outlet valve with said second cylinder on the side of said piston opposite said last mentioned spring, a passage through said last mentioned piston, a spring loaded valve controlling said last mentioned passage and being adapted to open when the pressure in the forward end of said second cylinder reaches a predetermined value, means for adjusting the compression on said last mentioned spring, means defining a cylindrical chamber in said conduit, a floating piston in said chamber, a passage through said last mentioned piston, and a check valve in said last mentioned passage permitting the flow of fluid through said last mentioned passage only to the brakes.

2. In a brake system for a towed vehicle, a brake actuating mechanism including a housing having a master cylinder therein, a reservoir above said cylinder, a piston in said cylinder having a head and a recessed portion adjacent said head, a conduit connected to said housing for delivering fluid from the forward end of said cylinder to the vehicle brakes, a spring loaded outlet valve in said conduit, an inlet valve in the forward end of said cylinder, a spring in said cylinder reacting between said head and said inlet valve, ports connecting said reservoir with said cylinder on opposite sides of said head when said piston is fully withdrawn from the forward end of the cylinder, ports through said head for flow of fluid into the forward end of said cylinder, a longitudinally movable tow bar for connecting the towed vehicle to a towing vehicle, a spring for urging said bar toward the towing vehicle, a rod connecting said bar with said piston for urging said piston toward the forward end of the cylinder when a predetermined pressure is placed on said bar, a groove in the wall of said cylinder near the forward end thereof for by-passing fluid into said recessed portion, a second cylinder in said housing, a piston in said second cylinder, a spring in said cylinder urging said piston toward one end, a passage connecting said conduit on the outlet side of said outlet valve with said second cylinder on the side of said piston opposite said last mentioned spring, a passage through said last mentioned piston, a spring loaded valve controlling said last mentioned passage and being adapted to open when the pressure in the forward end of said second cylinder reaches a predetermined value, and means for adjusting the compression on said last mentioned spring.

3. In a brake system for a towed vehicle, a housing having a master cylinder and a reservoir, a piston in said cylinder having a head and a recessed portion adjacent said head, a conduit connected to said housing for delivering fluid from the forward end of said cylinder to the vehicle brakes, a spring loaded outlet valve in said conduit, an inlet valve in the forward end of said cylinder, a spring in said cylinder reacting between said head and said inlet valve, ports connecting said reservoir with said cylinder on opposite sides of said head when said piston is fully withdrawn from the forward end of the cylinder, a reciprocable tow bar for connecting the towed vehicle to a towing vehicle, a spring for urging said bar toward the towing vehicle, a member connecting said bar with said piston for urging said piston toward the forward end of the cylinder when a predetermined pressure is placed on said bar, a groove in the wall of said cylinder for by-passing fluid into said recessed portion, a second cylinder in said housing, a piston in said second cylinder, a spring in said cylinder urging said piston toward one end, a passage connecting said conduit on the outlet side of said outlet valve with said second cylinder on the side of said piston opposite said last mentioned spring, a passage through said last mentioned piston connecting the forward side of said last mentioned piston with said reservoir, and a spring loaded valve controlling said last mentioned passage and being adapted to open when the pressure in the forward end of said second cylinder reaches a predetermined value.

4. In a brake system for a towed vehicle, a housing having a master cylinder and a reservoir, a piston in said cylinder having a head and a recessed portion adjacent said head, a conduit connected to said housing for delivering fluid from the forward end of said cylinder to the vehicle brakes, a spring loaded outlet valve in said conduit, a spring in said cylinder reacting between said head and said inlet valve, ports connecting said reservoir with said cylinder on opposite sides of said head when said piston is fully withdrawn from the forward end of the cylinder, a reciprocable tow bar for connecting the towed vehicle to a towing vehicle, a spring for urging said bar toward the towing vehicle, a member connecting said bar with said piston for urging said piston toward the forward end of the cylinder when a predetermined pressure is placed on said bar, a groove in the wall of said cylinder near the forward end thereof for by-passing fluid into said recessed portion, a second cylinder in said housing, a piston in said second cylinder, a spring in said last mentioned cylinder urging said piston toward one end, a passage connecting said conduit on the outlet side of said outlet valve with said second cylinder on the side of said piston opposite said last mentioned spring, and a passage through said last mentioned piston connecting the forward side of said last mentioned piston with said reservoir.

References Cited in the file of this patent
UNITED STATES PATENTS

| | | |
|---|---|---|
| 2,125,702 | Watson | Aug. 2, 1938 |
| 2,149,189 | Shaffer | Feb. 28, 1939 |
| 2,385,625 | Hopmans | Sept. 25, 1945 |
| 2,571,323 | Yoder | Oct. 16, 1951 |
| 2,637,977 | Seppman | May 12, 1953 |
| 2,698,069 | Henry | Dec. 28, 1954 |
| 2,746,574 | Smith et al. | May 22, 1956 |
| 2,848,074 | Puddy | Aug. 19, 1958 |